June 18, 1968   E. P. BRINKEL   3,388,638
PISTON
Filed March 2, 1966
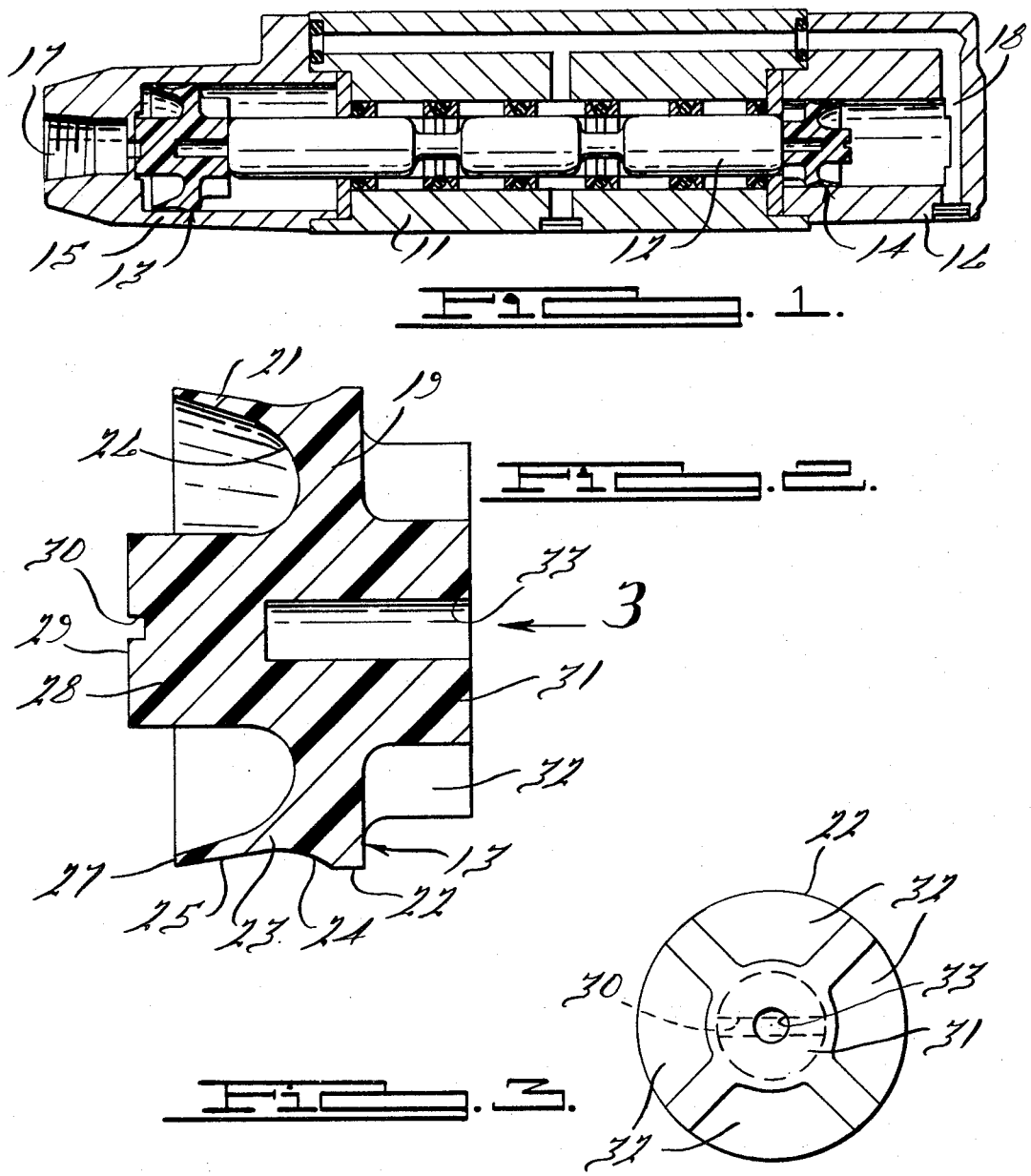
INVENTOR.
Edwin P. Brinkel
BY
Harness, Dickey & Pierce
ATTORNEYS.

United States Patent Office 3,388,638
Patented June 18, 1968

3,388,638
PISTON
Edwin P. Brinkel, Royal Oak, Mich., assignor to Ross Operating Valve Company, Detroit, Mich., a corporation of Michigan
Filed Mar. 2, 1966, Ser. No. 531,128
7 Claims. (Cl. 92—245)

ABSTRACT OF THE DISCLOSURE

An integrally formed plastic piston having a cylindrical body and a flared lip with a slight interference fit.

---

This invention relates to pistons, and more particularly to pistons adapted for use in the actuation of valves.

It is an object of the invention to provide a novel and improved piston construction which will avoid the necessity of lubricating the piston in order to reduce frictional resistance to its travel, while at the same time achieving a good sealing effect.

It is another object to provide an improved piston construction of this nature in which the use of multiple parts in constructing the piston may be avoided, the piston body and seal being fabricated as an integral unit.

Other objects, features and advantages of the present invention will become apparent from the subsequent description and the appended claims taken in conjunction with the accompanying drawings, in which:

FIGURE 1 is a cross-sectional view in elevation of a typical fluid-operated valve utilizing a pair of pistons made in accordance with the invention;

FIGURE 2 is an enlarged cross-sectional view of the piston itself, and

FIGURE 3 is an end elevational view of a piston taken in the direction of the arrow 3 of FIGURE 2.

Briefly, the illustrated embodiment of the invention comprises an integrally formed piston having a sealing portion and a body formed of a plastic material having high impact resistance and tensile strength, rigidity in thick sections, resilience in thin sections, a high temperature and abrasion resistance, and a low coefficient of friction.

The piston sealing portion comprises a flared lip having a slight interference fit with the cylinder. This lip has a relatively thin cross section which is tapered toward the sealing lip, so that it will have resilience and flex mainly near its outer edge. It is connected to the body by a fillet of relatively large radius, the body having a relatively thick cross-sectional shape. The body also has a smooth outer cylindrical surface to be guided by the cylinder, but with a looser fit than the lip. A central projection from the body extends in the same direction as the lip, so as to prevent damage to the lip when the piston reaches one end of its stroke.

Referring more particularly to the drawings, a valve body is indicated at 11 in FIGURE 1 and carries a valve spool 12 therein. A piston generally indicated at 13 engages the left hand end of this valve spool and another piston generally indicated at 14 engages the right hand end. These pistons are disposed in cylinders 15 and 16 respectively, piston 13 having a larger diameter than piston 14. A port 17 is centrally arranged at the outer end of cylinder 15 and another passage 18 is connected with the outer end of cylinder 16. The pistons have one-way connections with the spool so that piston 13 will push it to the right and piston 14 to the left.

The pistons have similar constructions and a description of piston 13 will therefore suffice for understanding of the invention. This piston is constructed of a plastic material having high impact resistance and tensile strength, rigidity in thick sections but resilience in thin sections, high temperature and abrasion resistance, and a low coefficient of friction. A suitable material has been found to be polypropylene, and certain types of high density polyethylenes, nylon and other semi-rigid plastics could be suitable.

It is one of the main purposes of the piston of this invention to avoid the necessity of lubrication during operation while still retaining low friction characteristics. In fluid-operated valves such as that shown in FIGURE 1, the fluid pressure required to shift the valve must also overcome the frictional resistance of the piston itself within its cylinder. In the case of the conventional piston carrying a seal of rubber or similar material, it has been found necessary to keep the piston lubricated in order to avoid excessive friction. Otherwise, the rubber sliding on the cylinder wall will have high frictional characteristics since the coefficient of friction of rubber is high.

By constructing the piston in the unitary manner about to be described, and using a plastic material having the aforementioned properties, it has been found possible to shift a fluid-operated valve repeatedly for an indefinite period without the necessity of lubricating the piston at all. This is a very great advantage in the day-to-day operation of control valves, for example, in the field and in shops and factories, since the problem and expense of maintaining such control valves in trouble-free condition is greatly reduced. It should be kept in mind that these control valves very often control the operation of very large machines such as presses, so that their faulty operation could be expensive or even disastrous.

Piston 13 has a body 19 and a lip 21 extending therefrom. Body 19 is of generally cylindrical shape, having an outer surface 22 which is fully cylindrical and is guided by the inner surface of cylinder 15. Actually, there will be a slight clearance between the cylinder and surface 22 to reduce friction to a minimum.

The transitional portion 23 of the piston between body 22 and lip 21 is formed with an outer recess 24 which blends into an outwardly flared surface 25. The flare angle of this surface is suitably about 10°. The inside of lip 21 has a slightly greater flare angle, perhaps 15°, and is blended into the body by a curved surface 26 having a large radius of curvature.

The outer end 27 of lip 21 may be squared off, and its outer diameter is preferably slightly greater than the diameter of the inner surface of cylinder 15. When assembled, the piston therefore will have a slight interference fit with the cylinder.

The cross-section of lip 21 will be quite thin, perhaps 10 to 15 thousandths of an inch. In the case of polypropylene, this relatively thin section will mean that the material will be resilient instead of rigid as it is with thicker sections such as that of body 19. In fact, lip 21 may be transparent when polypropylene is used, whereas the remainder of the piston is translucent or opaque.

A projection 28 extends from the central portion of body 19 through the past lip 21. This extension has a squared-off end 29 and is for the purpose of engaging the end of cylinder 15 so that lip 21 will not be damaged when the piston is at the end of its stroke. A slot 30 is formed centrally of extension 27 so as to avoid the existence of a hydraulic seal effect at the end of the piston and also to permit proper flow through port 17.

Another projection 31 extends centrally from the main part of body 19 in the opposite direction. This extension has the same diameter as that of surface 22 but is relieved at spaced portions 32, as seen in FIGURE 3. The main purpose of these relieved portions is to avoid the use of unneeded material and to accommodate shrinkage which might occur during a molding operation. A central recess 33 in projection 31 is also for the purpose of conserving unneeded material.

The piston may be made by a molding operation, for example, with a two-part mold in which the parts are coaxial and have a parting line perhaps at one of the edges of surface 22. In withdrawing the mold half over lip 21, its resilience will permit such withdrawal despite the presence of recess 24.

In operation, fluid pressure on the left hand side of the piston will cause expansion of lip 25 against the cylinder wall. Because of the tapered nature of the lip, the major flexing will be close to the bore surface, thereby avoiding too much of an increase in contact area between the lip and bore. Nevertheless, a complete seal will be effectuated. In fact, it has been found that after running for a while the lip edge will conform to a score marks in the cylinder wall, thus enabling the valve to operate even under such conditions.

Because of the low coefficient of friction of the material used, it has been found that the resistance to sliding movement of the novel piston without lubrication will approach that of a lubricated elastomeric seal of the ordinary type. With lubrication, it will offer even less resistance. Wearing of the lip edge with use will not reduce the effectiveness of the seal since it will still flex outwardly into sealing contact with the bore.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A piston and cylinder combination; said cylinder having a bore, and said piston comprising an integrally formed body and lip fabricated of a plastic material having high impact resistance and tensile strength, rigidity in thick sections but resilience in thin sections, high temperature and abrasion resistance and a low coefficient of friction, the body being of cylindrical shape and of relatively thick cross section, the lip extending in flared fashion from one side of said body and being of relatively thin cross-sectional shape, whereby the body will be substantially rigid but the lip will flex outwardly in response to fluid pressure to sealingly engage the cylinder bore within which a piston is disposed, the outer edge of the lip when in unstressed condition having a slight interference fit with the bore, the outer surface of the body being cylindrical and having a non-interfering fit with the bore and a transitional portion between said lip and said outer surface of the body, said transitional portion being recessed radially inwardly from said outer surface of the body and blending into an outwardly flared surface on said lip.

2. The combination according to claim 1, said piston further being provided with a connecting portion between the inner surface of the lip and the adjacent side of the body, said last-mentioned connecting portion having a relatively large radius of curvature.

3. The combination according to claim 2, the cross section of said lip gradually increasing in size from its outer edge to the portion adjacent said body, whereby the major flexing of said lip when it engages the bore under internal pressure will be adjacent its outer edge.

4. The combination according to claim 1, said piston further being provided with a central projection on said body extending through and spaced inwardly from said lip, the outer end of said projection extending axially further than the outer edge of said lip, whereby said lip will be protected from damage when the piston reaches the end of its stroke.

5. The combination according to claim 4, said piston further being provided with a second projection having the same diameter as and extending from the other side of said body, and angularly spaced recesses on the outer portions of said second projection.

6. The combination according to claim 4, said piston further being provided with a central slot in said projection end.

7. The combination according to claim 1, the material from which said piston is formed being selected from the group consisting of polypropylene, polyethylene and nylon.

References Cited
UNITED STATES PATENTS

| | | | |
|---|---|---|---|
| 2,360,577 | 10/1944 | Parrish | 277—205 X |
| 2,465,175 | 3/1949 | Schwarz | 277—205 |
| 2,664,163 | 12/1953 | Schnitter | 92—243 X |
| 2,726,124 | 12/1955 | Boyce | 92—254 X |
| 2,957,735 | 10/1960 | Snyder | 92—240 |
| 2,984,529 | 5/1961 | Dailey | 92—243 X |
| 2,994,571 | 8/1961 | Peras | 92—243 X |
| 3,055,396 | 9/1962 | Koch | 92—240 X |
| 3,176,595 | 4/1965 | Schwartz | 92—243 |
| 3,272,079 | 9/1966 | Bent | 92—240 X |

MARTIN P. SCHWADRON, *Primary Examiner.*

EDGAR W. GEOGHEGAN, *Examiner.*

G. N. BAUM, *Assistant Examiner.*